United States Patent
Cherian et al.

(10) Patent No.: US 10,282,268 B1
(45) Date of Patent: May 7, 2019

(54) SOFTWARE FLOW EXECUTION TRACING

(71) Applicant: Cisco Technology, Inc., San Jose, CA (US)

(72) Inventors: Zachariah Cherian, Cupertino, CA (US); Pratap Pereira, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 15/338,558

(22) Filed: Oct. 31, 2016

(51) Int. Cl.
*G06F 11/00* (2006.01)
*G06F 11/30* (2006.01)
*G06F 11/36* (2006.01)
*G06F 11/34* (2006.01)

(52) U.S. Cl.
CPC ........ *G06F 11/302* (2013.01); *G06F 11/3075* (2013.01); *G06F 11/3082* (2013.01); *G06F 11/3476* (2013.01); *G06F 11/3636* (2013.01)

(58) Field of Classification Search
USPC .................................................. 714/38.1, 45
See application file for complete search history.

(56) References Cited

U.S. PATENT DOCUMENTS

| | | | |
|---|---|---|---|
| 7,398,429 B2 | 7/2008 | Shaffer et al. | |
| 7,992,133 B1 | 8/2011 | Theroux et al. | |
| 8,490,064 B2 | 7/2013 | Shrivastava et al. | |
| 8,601,443 B2 | 12/2013 | Barker et al. | |
| 9,274,919 B2 | 3/2016 | Greifeneder et al. | |
| 2004/0210877 A1* | 10/2004 | Sluiman | H04L 67/22 717/130 |
| 2010/0223446 A1* | 9/2010 | Katariya | G06F 11/3495 712/220 |
| 2014/0006279 A1* | 1/2014 | Salgueiro | G06Q 30/01 705/44 |
| 2014/0222878 A1* | 8/2014 | Avati | G06F 11/30 707/827 |
| 2015/0370640 A1* | 12/2015 | Paskalev | G06F 11/1484 714/15 |
| 2017/0150331 A1* | 5/2017 | Van Snellenberg | H04W 4/12 |

OTHER PUBLICATIONS

Song, et al., "RPC Chains: Efficient Client-Server Communication in Geodistributed Systems", www.cs.cornell.edu, Apr. 21, 2016, 15 pages, Microsoft Research Silicon Valley / Cornell University.

* cited by examiner

*Primary Examiner* — Sarai E Butler
(74) *Attorney, Agent, or Firm* — Behmke Innovation Group LLC; James Behmke; Stephen D. LeBarron

(57) ABSTRACT

In one embodiment, a logging process initiates a trace of an execution flow across a plurality of processes, and creates a log context for the trace, the log context having a universally unique identifier (UUID) and an indication that the trace is to be performed as the plurality of processes are executed during the execution flow. The logging process manages passage of the log context across the plurality of processes during the execution flow, and gathers log entries from the plurality of processes based on the UUID for the trace, where the log entries were created based on the indication being within the log context. As such, the logging process may stitch the log entries into a flow execution log for the trace of the execution flow.

20 Claims, 19 Drawing Sheets

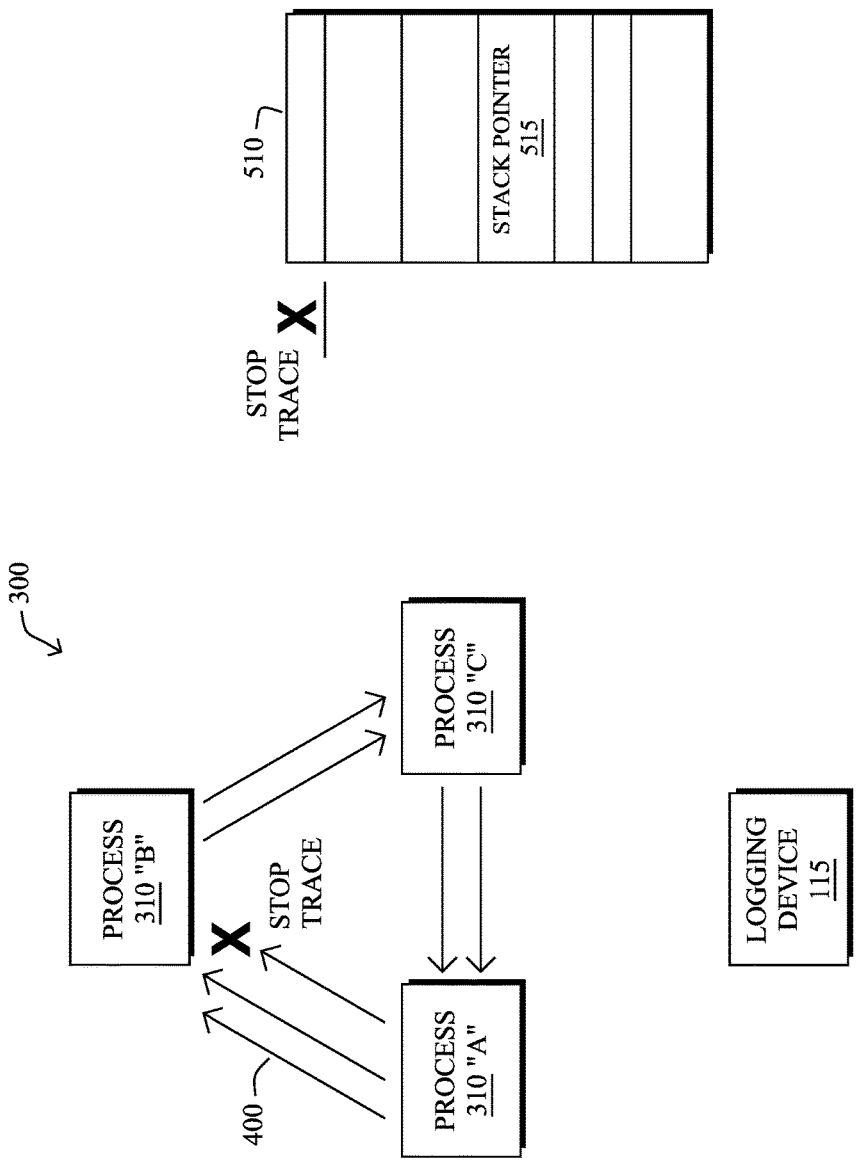

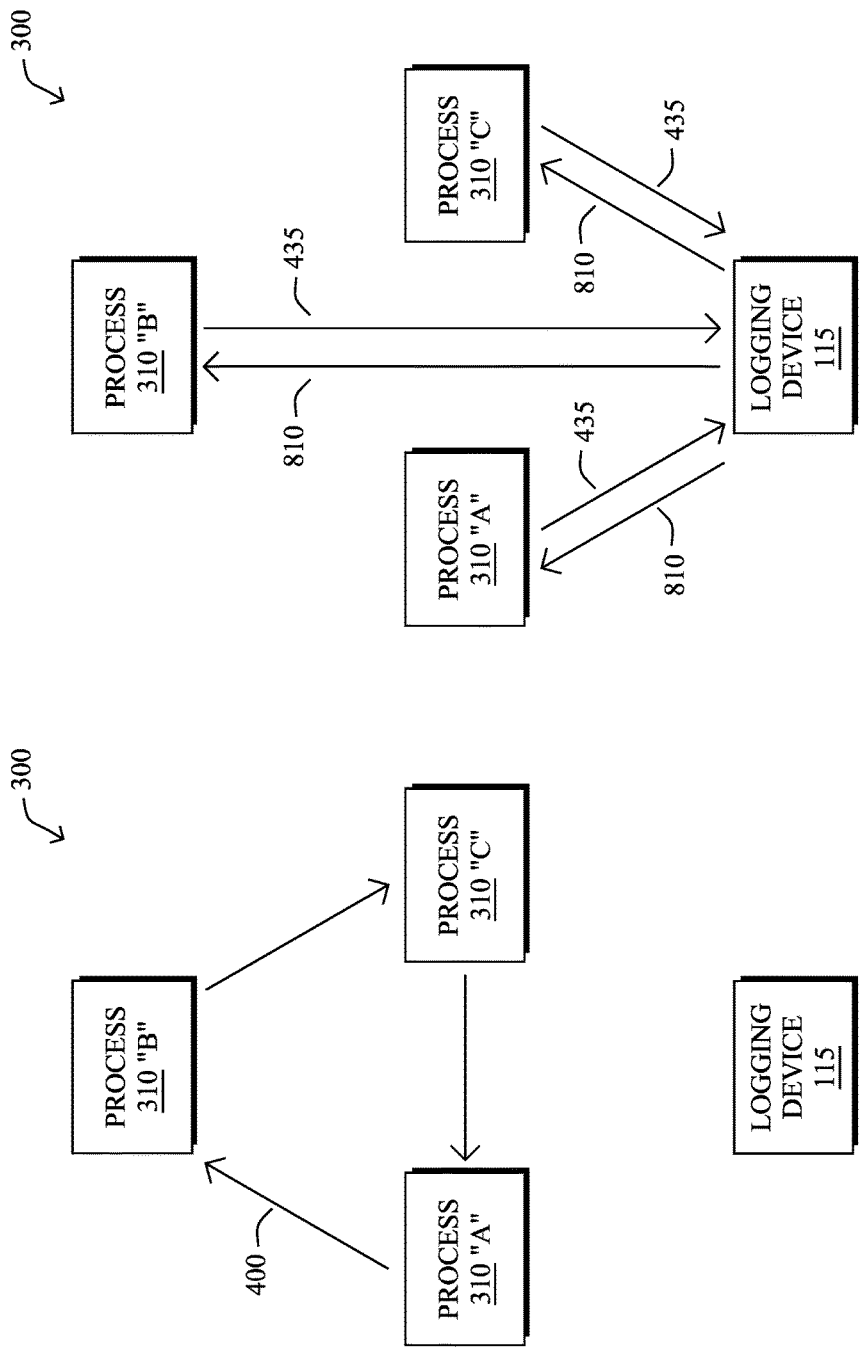

SOFTWARE FLOW EXECUTION TRACING

TECHNICAL FIELD

The present disclosure relates generally to computer systems, and, more particularly, to software flow execution tracing (e.g., for event logging and/or debugging).

BACKGROUND

Software processes running within computing devices typically employ some form of logging, such as for debugging or tracing. Most of these methods are contained within a given process context and often activated within module boundaries. Being able to observe an execution flow across processes within a single device or across multiple devices can be difficult, particularly when trying to coordinate consistency across multiple software components. For example, tracing output among disparate development teams can be a burdensome process, and hence it becomes hard to correlate an execution flow even within a software process, let alone across multiple processes and systems. The problem is compounded when debugging at scale or in the field because of a large amount of output that is generated with module debugs.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6C illustrate examples of stopping software flow execution tracing;

FIGS. 8A-8B illustrate an example of pull-based log gathering;

DESCRIPTION OF EXAMPLE EMBODIMENTS

Overview

Figure 1:
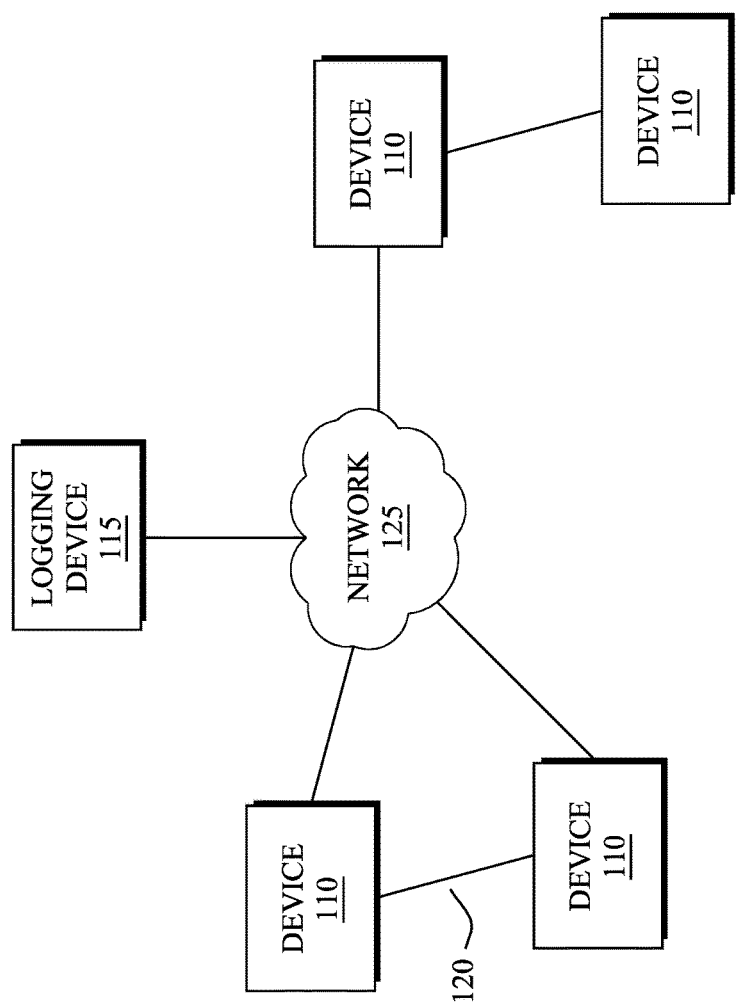
FIG. 1 illustrates an example computer network.

According to one or more embodiments of the disclosure, a logging process (e.g., a debugger process) initiates a trace of an execution flow across a plurality of processes, and creates a log context for the trace, the log context having a universally unique identifier (UUID) and an indication that the trace is to be performed as the plurality of processes are executed during the execution flow. The logging process manages passage of the log context across the plurality of processes during the execution flow, and gathers log entries from the plurality of processes based on the UUID for the trace, where the log entries were created based on the indication being within the log context. As such, the logging process may stitch the log entries into a flow execution log for the trace of the execution flow.

Description

Computer systems have developed significantly over the years, and have become more complex with the emergence of multiprocessing, multiprogramming, and multithreaded processing. For instance, computer systems may allocate tasks between two or more central processing units (CPUs) within a single computer system, and/or at the operating system level, may execute multiple concurrent processes in a system, with each process running on a separate CPU or core. Also, multithreading is the ability of a CPU or a single core in a multi-core processor to execute multiple processes or threads concurrently, appropriately supported by the operating system. (A thread is a sequence of instructions to which the operating system allocates processor time, so processes that have more than one thread are called multi-threaded.)

Computers with multiple processors, multi-core processors, or hyperthreading processes can run multiple threads at the same time, as can distributed computing systems where multiple devices participate in the execution of a process. For example, inter-process communication (IPC) defines mechanisms provided by an operating system to allow managed processes to share data. That is, IPC mechanisms may be used between processes/processors on a single device, or else across multiple devices, such as, e.g., between clients and servers, or between multiple devices in a cross-device process.

A computer network is a collection of devices or nodes interconnected by communication links, such as personal computers, workstations, servers, routers, switches, sensors, or other devices. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols.

FIG. 1 is a schematic block diagram of an example simplified computer network 100 illustratively comprising nodes/devices, such as a plurality of computing devices 110 interconnected by links 120 or networks 125, as shown. For example, data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. One particular device, a logging device 115, may also be in communication with other devices in the network, and may be configured as described herein to perform logging (e.g., debugging) functionality on processes executing on the device 115 itself, or else on one or more other devices 110. Those skilled in the art will understand that any number of nodes, devices, links, etc. may be used in the computer network, and any configuration of networked devices may be arranged, and that the view shown herein is for simplicity.

Figure 2:
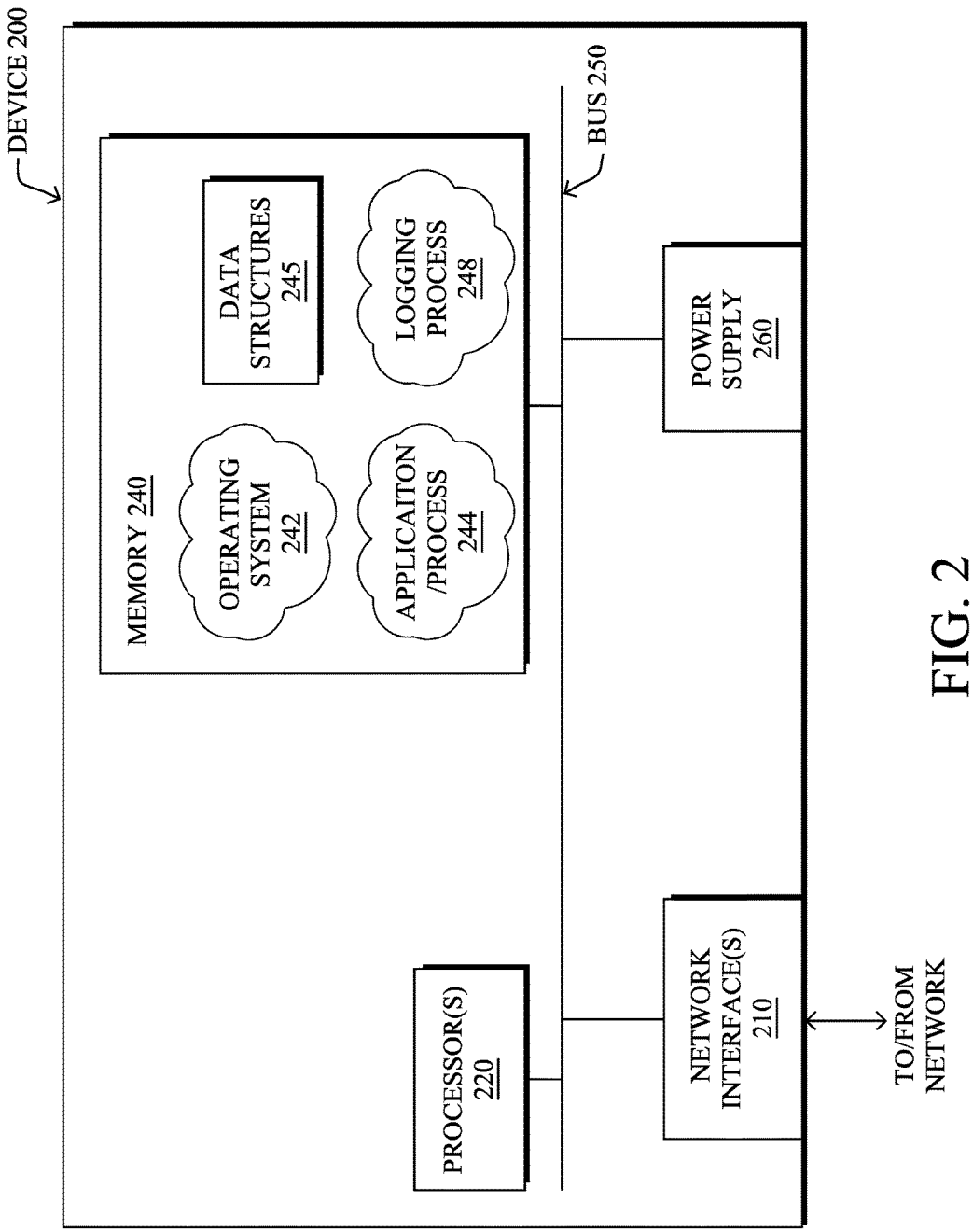
FIG. 2 illustrates an example computing device.

FIG. 2 is a schematic block diagram of an example node/device 200 that may be used with one or more embodiments described herein, e.g., as any of the computing devices 110 or 115 shown in FIG. 1, or any other suitable device. Device 200 comprises one or more network interfaces 210, one or more processors 220, and a memory 240 interconnected by a system bus 250, and is powered by a power supply 260. The network interfaces 210 include the mechanical, electrical, and signaling circuitry for communicating data over physical links coupled to the network 100. The network interfaces may be configured to transmit and/or receive data using a variety of different communication protocols.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the device by, among other things, invoking operations in support of software processes and/or services executing on the device. These software processes and/or services may comprise an illustrative "application/process 244" and a logging process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Application/process 244 includes computer executable instructions executed by one or more processors 220 (e.g., on one or more devices) to perform various functions. For example, in one embodiment, such functionality may be related to computer networking (e.g., routing and/or switching protocols), though any computer program, process, application, functionality, etc., including portions of operating system 242, may be implemented as the "application/process 244" used herein, as may be appreciated by those skilled in the art. Illustratively, the app/process 244 may be a cross-process system, that is, where an execution flow occurs across a plurality of processes. For instance, an illustrative cross-process execution flow may comprise establishment of a virtual private network (VPN), where devices within a network 100 need to communicate with one another in order to establish a VPN between devices/networks (e.g., security handshakes, credential passing, configuration messages, and so on). Many other examples exist, such as multi-device processes (e.g., client/server relationships) as well as single device processes (e.g., localized data processing), and any examples mentioned herein are not meant to limiting to the scope of the disclosure.

Figure 3:
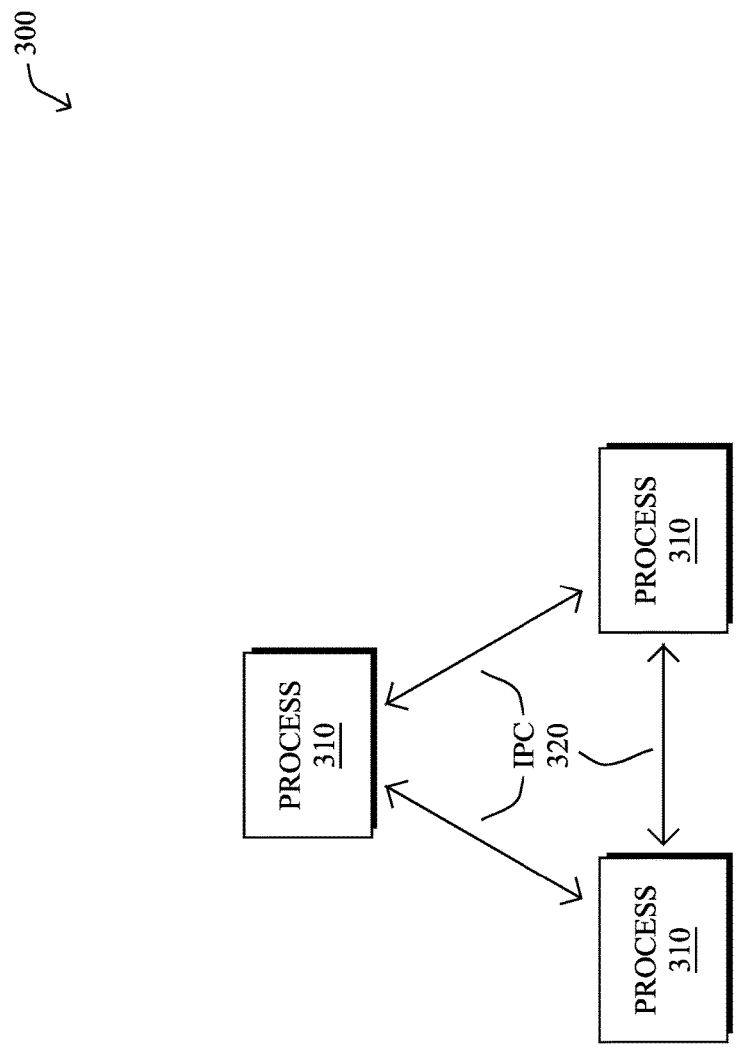
FIG. 3 illustrates an example of inter-process communication (IPC)

FIG. 3 illustrates an example of a simplified interprocess communication (IPC) system 300, where a plurality of processes 310 are configured to communicate with one another over IPC mechanisms/links 320 (e.g., links 120, networks 125, internal busses 250, etc.). Illustratively, the IPC system may include a mesh configuration (each process can speak to each other process), or else only certain processes can speak to other processes (more often the case when the processes are located on different devices). Said differently, a cross-process system that uses some form of IPC, whether dedicated IPC protocols on a single device or between separate devices, or else as commands and responses over a computer network (e.g., packets 140), may comprise any combination of CPUs, cores, blades, different devices ("boxes"), etc., where one or more software applications/processes 244 are configured to collaboratively execute across a plurality of CPUs (referred to herein as an execution flow across a plurality of processes). For instance, an operating system 242 itself could have lots of systems, apps, processes, etc. executing as a complex set/flow of processes 244.

As noted above, software processes running within computing devices typically employ some form of logging, such as for debugging or tracing, but mostly this logging is contained within a given process context and often activated within module boundaries. Debugging, for instance, generally refers to the process of finding and resolving of defects that prevent correct operation of computer software or a system, and involve control flow examination, integration testing, log files, memory dumps, profiling, and so on. Observing an execution flow across processes within a single device or across multiple devices can be difficult, however, a problem that is compounded when debugging at scale or in the field because of a large amount of output that is generated with module debugs. Moreover, as software developers move towards solutions and architectures involving multiple processors and/or devices, very often troubleshooting a problem requires looking at an execution flow (e.g., in response to a configuration update) across several software processes and sometimes software systems. For example, if the result of the VPN establishment example above is an error, one might like to determine where and/or why the error occurred. Since there may be a large number of participating line cards, CPUs, devices, links, interfaces, etc. that are involved in the establishment of a VPN, there would be many sets of spread-out logs to examine, where locating the inter-process correlation between each process log for the particular execution flow is currently a tedious, if even possible, manual process.

Software Flow Execution Tracing

The techniques herein identify and correlate a chain of call stack execution that span software processes and even software processes across systems where the execution proceeds between software processes using some form of messaging IPC. Illustratively, a runtime infrastructure may perform the propagation of a log context (or "debug context") and the start/termination of the tracing for an execution flow for single or multithreaded processes. As described below, traces can be emitted while keeping debug condition evaluation overhead low, and the techniques herein maintain a strong accompanying focus on minimizing developer work and guarding against developer frailty. This "radioactive tracing" allows debugging at scale of events of interest.

Specifically, according to one or more embodiments of the disclosure as described in detail below, a logging process (e.g., a debugger process or other software process) initiates a trace of an execution flow across a plurality of processes, creates application metadata that needs to be associated with that execution flow (e.g., user name or network address), and creates a log context for the trace, the log context having a universally unique identifier (UUID) and an indication that the trace is to be performed as the plurality of processes are executed during the execution flow. The logging process manages passage of the log context across the plurality of processes during the execution flow, and gathers log entries from the plurality of processes based on the UUID for the trace, where the log entries were created based on the indication being within the log context. The infrastructure records association of the application metadata with a given UUID. As such, the logging process may stitch the log entries into a flow execution log for the trace of the execution flow.

Illustratively, the techniques described herein may be performed by hardware, software, and/or firmware, such as in accordance with the logging process 248, which may include computer executable instructions executed by a processor 220 to perform functions relating to the techniques described herein. For example, logging process may be co-located on a device logging its own processes, or else may be on one device that logs an execution flow that spans multiple devices, and on the multiple devices to participate in the logging, accordingly. Those skilled in the art will appreciate, therefore, that the illustrative logging process 248 is merely an example, and the techniques herein may be based on centralized or distributed computing, localized or remote computing, client or server computing, and so on, without deviating from the scope of the embodiments or their examples described herein.

Operationally, the tracing techniques herein, which may be referred to as "radioactive tracing" (e.g., marking the trace as it propagates along an execution flow), makes it possible to identify and correlate a chain of call stack execution that spans processes and even processes across systems where the execution proceeds between processes using some form of messaging IPC. The tracing may be activated selectively (e.g., when desired, based on certain events or conditions, etc.), or else may be consistently activated for total visibility into the processes.

Figure 4A:
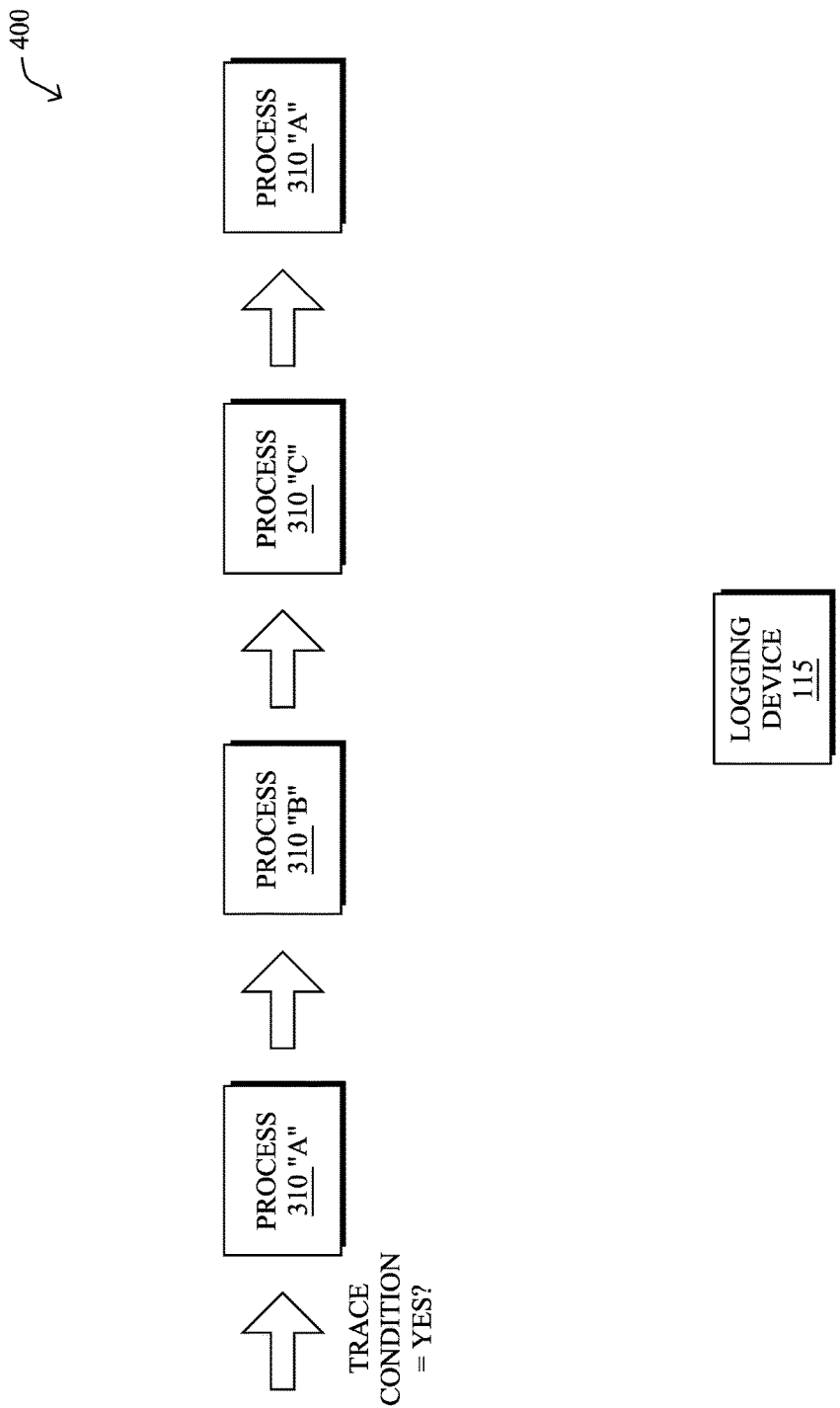
FIGS. 4A-4F illustrate an example of software flow execution tracing.
Figure 4B:
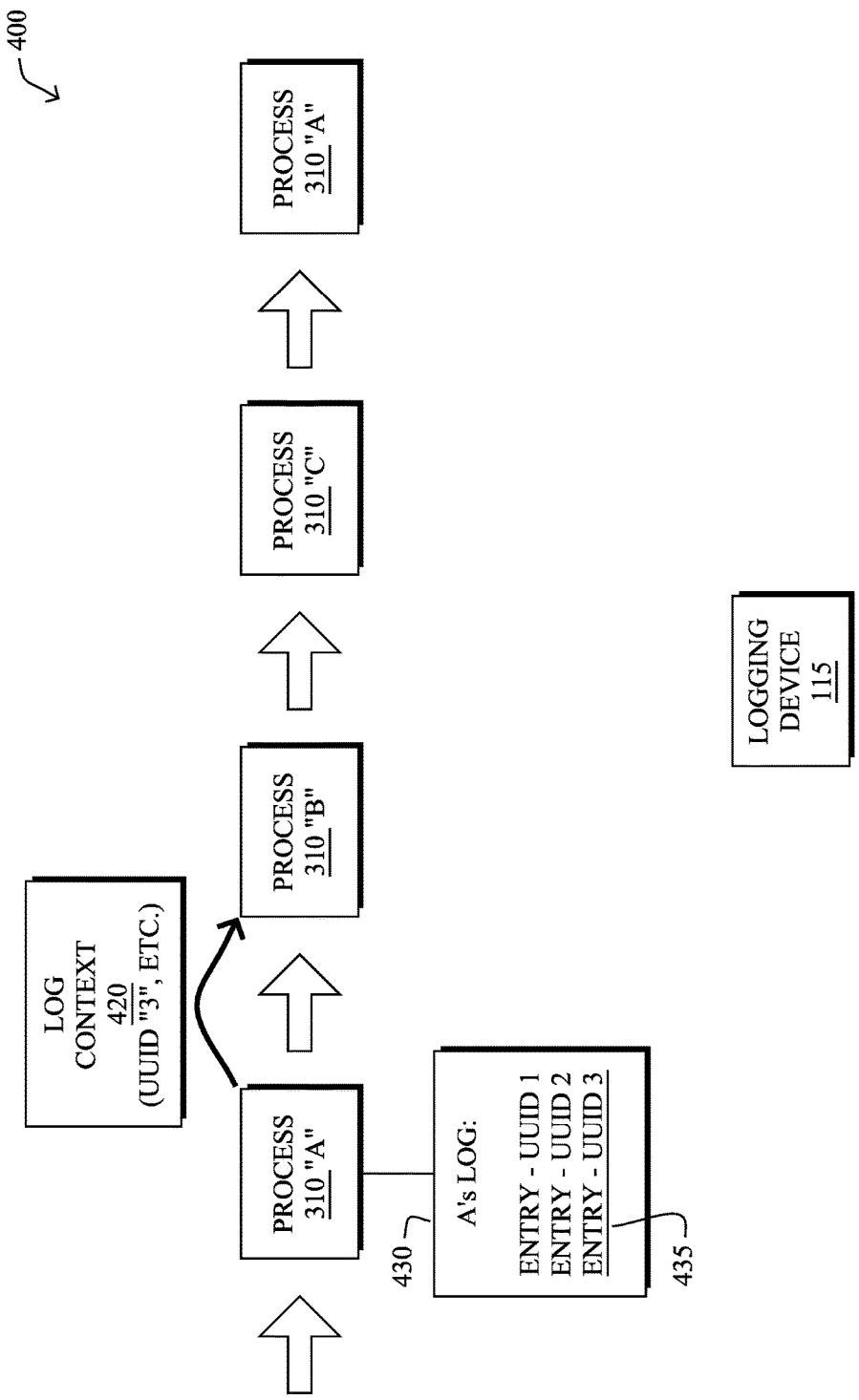
Figure 4C:
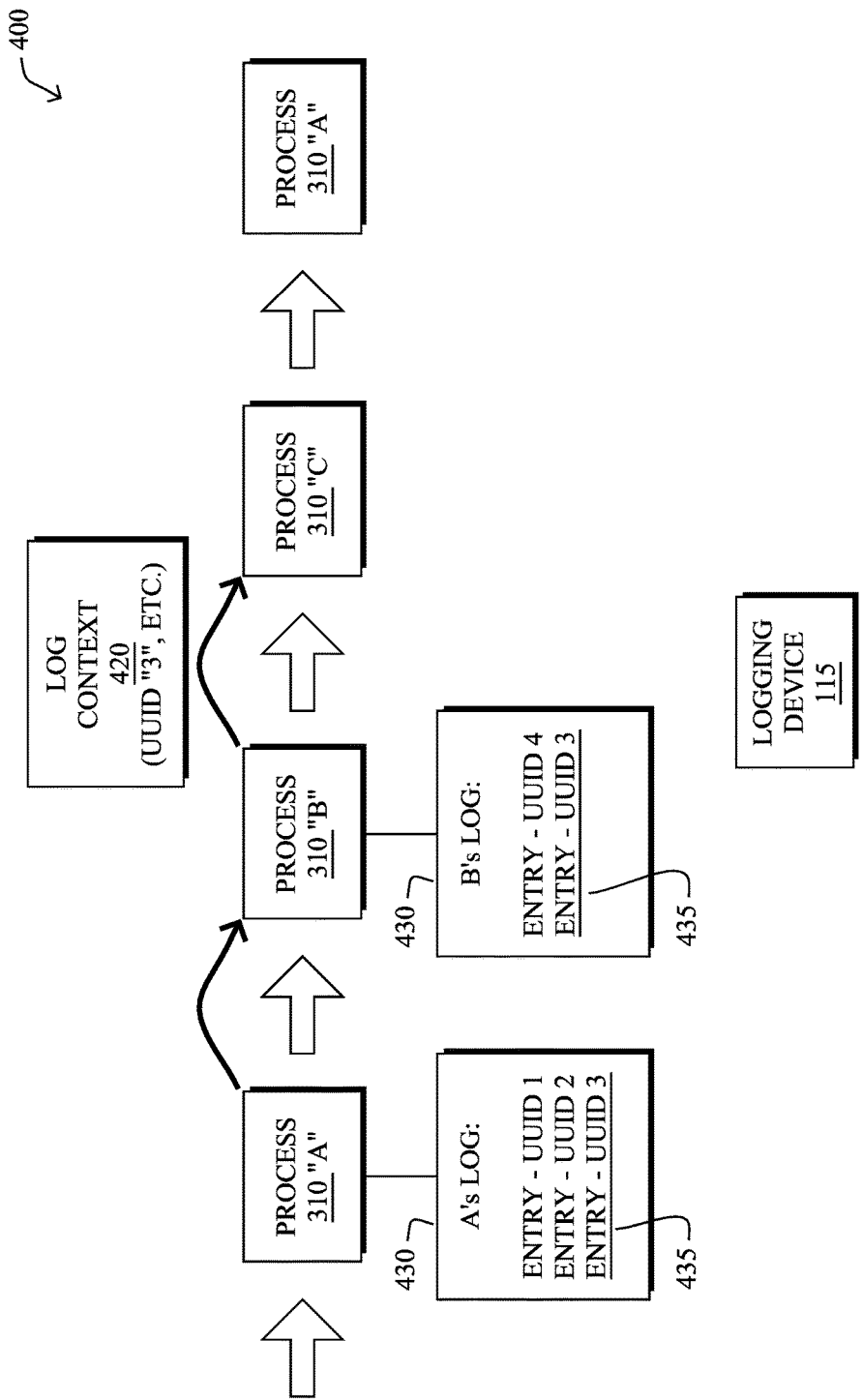
Figure 4D:
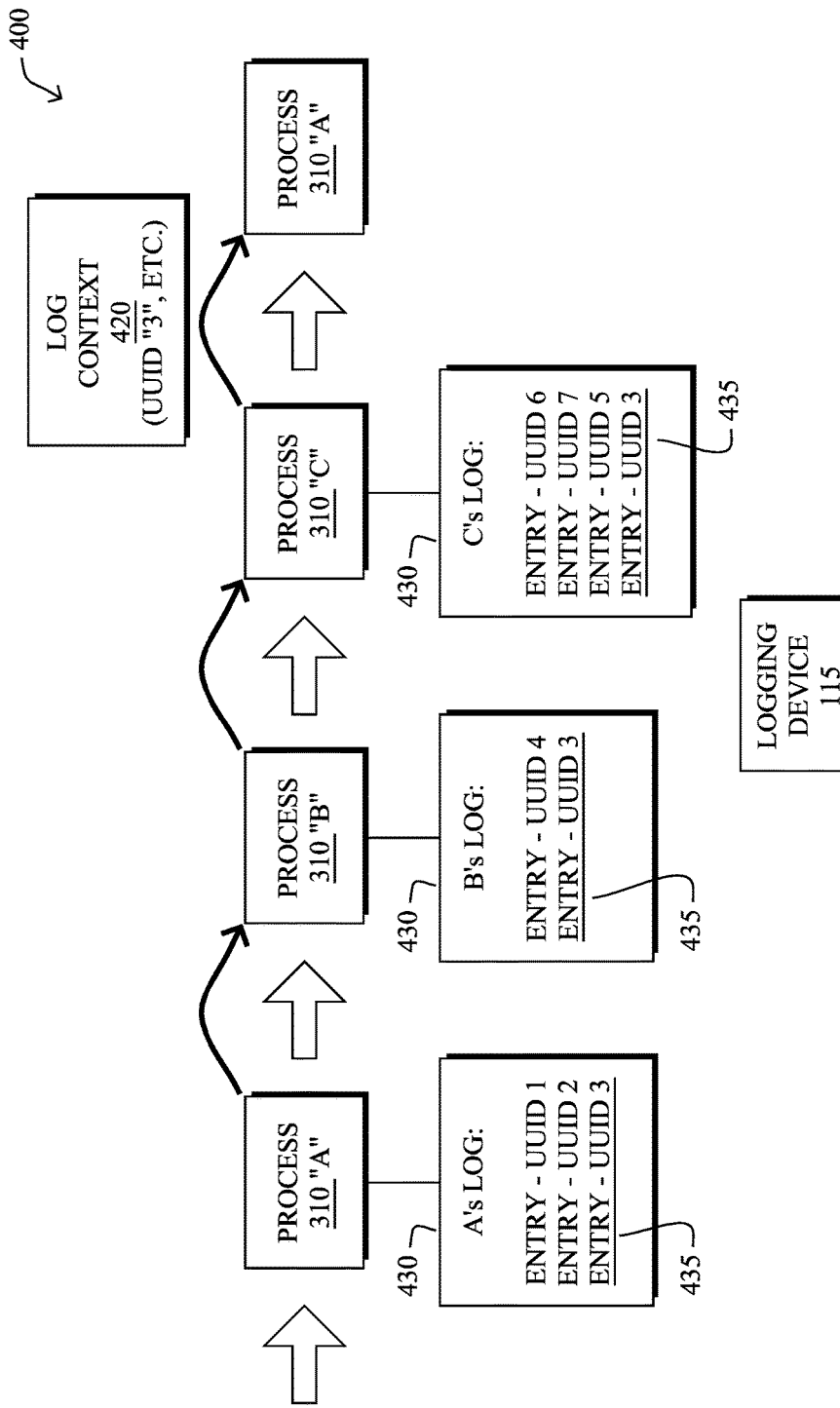
Figure 4E:
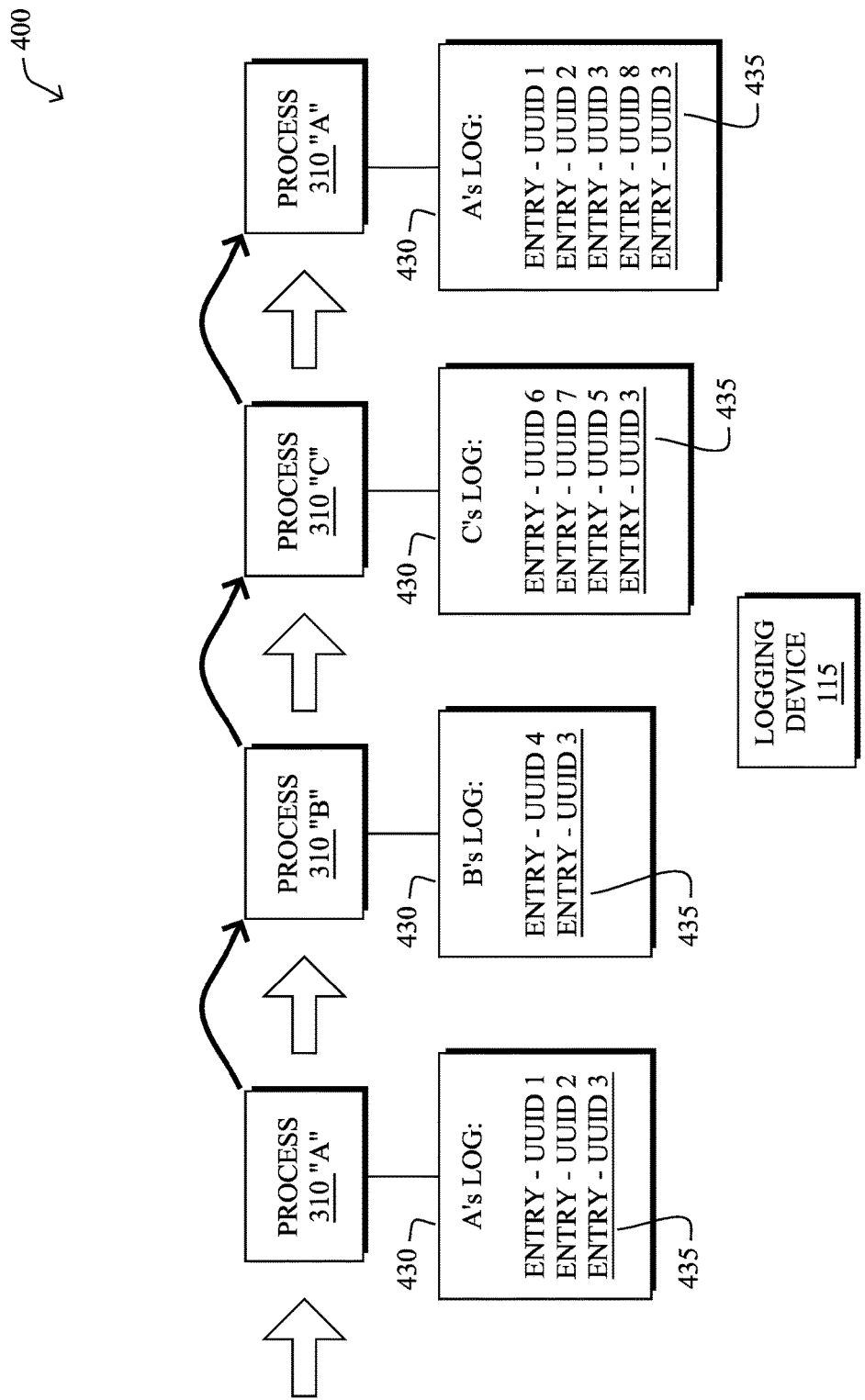

FIGS. 4A-4F illustrate an example of software flow execution tracing according to the techniques herein. In particular, processes 310 (i.e., those that notably participate in log sharing), such as processes "A", "B", and "C", may participate in an execution flow 300, where, as an example for discussion, the flow proceeds from A to B to C, and then back to A. As shown in FIG. 4A, assuming the trace begins at process A, in order to start the tracing, the logging feature or application may configure a "debug condition" (e.g., through a command line interface (CLI) or application programming interface (API)), or else makes a specific call to start the trace via an API, such as "start_tracing_api( )". The decision to start tracing is evaluated independently by the configured "start-of-trace" process A, where either the trace starts immediately in response to the API call, or else based on a conditional debug infrastructure that provides for evaluation of feature conditions. Examples of conditional debug (or conditional logging) may comprise particular processes, particular events, particular hardware utilization, particular source devices, particular destination devices, particular commands, particular API calls, and so on.

One key aspect of the techniques herein is that the decision to initiate a trace needs to be evaluated just once in the entire system(s), and not every time an application code within the execution flow tries to emit a trace (a log entry). This one-time evaluation of feature/application debug conditions, or one-time API command, keeps the evaluation overhead extremely low in the system. For instance, according to one or more embodiments of the techniques herein, an evaluation result by the start-of-trace process may be a Boolean value (e.g., yes/no, flag set/not-set, etc.) indicating whether tracing must be turned on or not along the processes of the execution flow 300.

Illustratively, at the start of tracing a universally unique identifier (UUID) (e.g., 64-bit) is generated and embedded in a log context (e.g., debug context) 420, which also contains the indication whether to perform the trace (e.g., Boolean TRACE:ON/OFF). In one embodiment, the process that initially calls the start_tracing( ) API (e.g., process A) provides a UUID (e.g., UUID "3"), where the remaining processes in that execution chain (e.g., processes B, C, then A again) simply use the same UUID "3" in that chain. Therefore the log entries 435 in the log files 430 corresponding to those processes will reflect that same UUID "3" (where, notably, log files 430 may contain other log entries with other UUIDs or no UUIDs at all). Said differently, unless a given process is initiating the tracing, it generally will not insert a new UUID, as there is no need to. Note further that every application process 310 (particularly logging processes 248) in the system may be seeded to ensure partitioning of this UUID space between the processes ensuring its uniqueness.

Figure 4F:
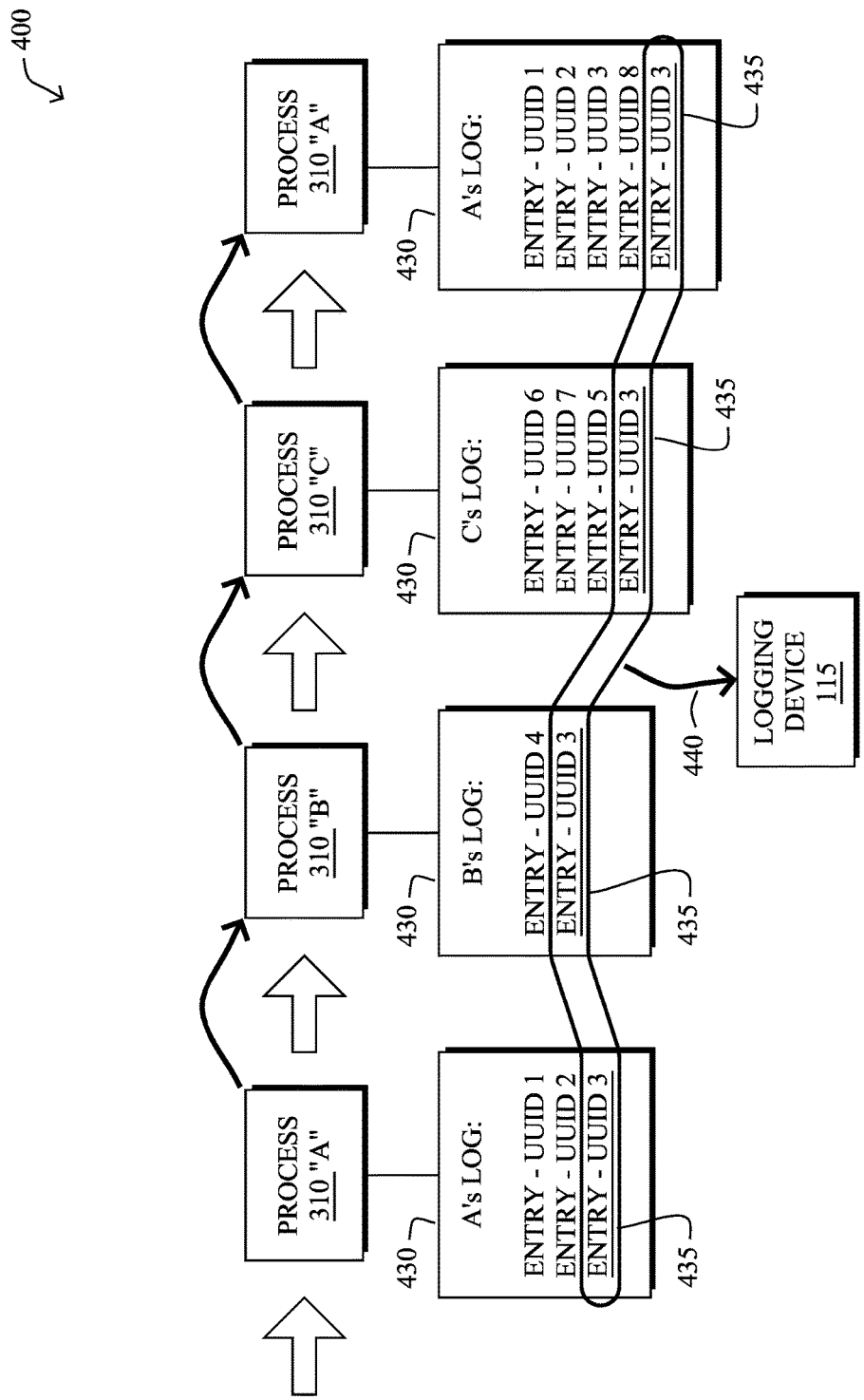

Both the UUID and Boolean result are part of the log context 420 that is then propagated through the call stack during execution of the flow, where, as shown in the sequence of FIGS. 4B-4E, each process 310 receives the log context 420, and creates a log entry 435 (e.g., within other log entries 430) pertaining to this portion of the execution flow with that initially created UUID "3". Note that the log context may include application-specific trace metadata, which may be illustratively inserted/removed using an API. As shown in FIG. 4F, therefore, by indexing the log entries 435 based on the UUID for the execution flow (UUID "3"), a logging process (e.g., logging device 115) may stitch the log entries together to create an execution flow log 440 for the flow associated with that corresponding UUID.

Figure 5B:
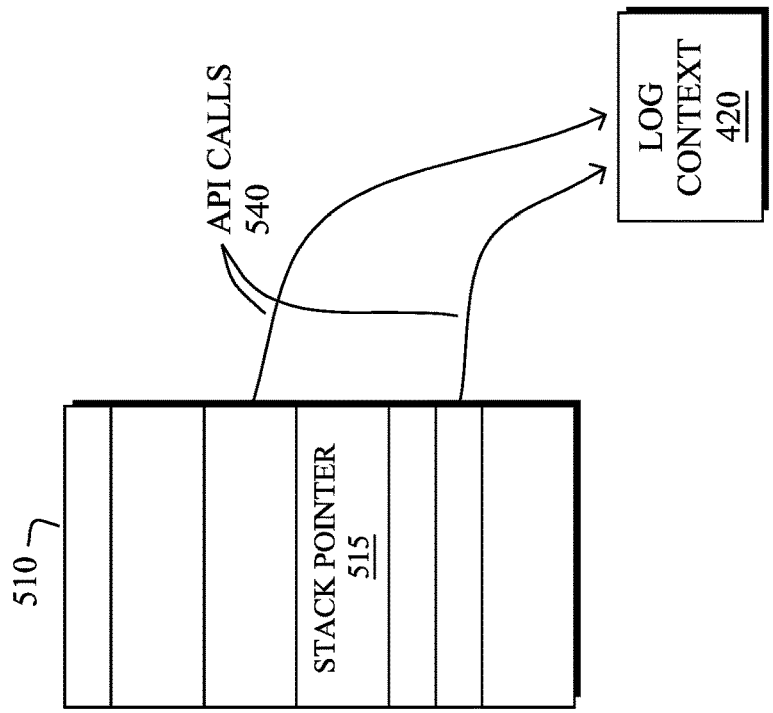
FIGS. 5A-5B illustrate examples of log context passing for software flow execution tracing.
Figure 5A:
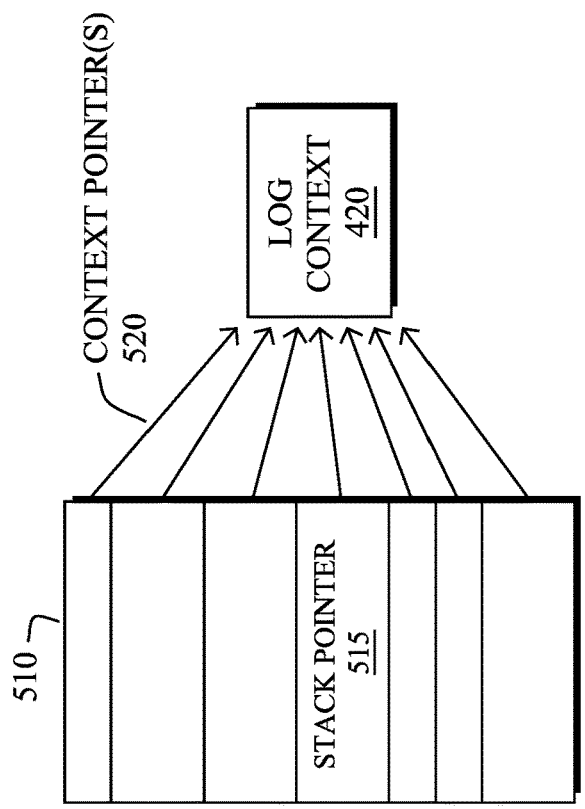

FIGS. 5A-5B illustrate examples of log context passing for software flow execution tracing in accordance with one or more embodiments herein. For instance, in FIG. 5A, preservation of the log/debug context 420 through a call chain is accomplished using compiler instrumentation of the software call stack that provides for debug context propagation. A cell stack 510 is a stack data structure that stores information about the active subroutines of a computer program (e.g., also referred to as an execution stack, program stack, control stack, run-time stack, or machine stack). As will be understood by those skilled in the art, a call stack is mostly used to keep track of the point (pointer 515) to which each active subroutine should return control when it finishes executing (an active subroutine is one that has been called but is yet to complete execution after which control should be handed back to the point of call).

The compiler instrumentation in FIG. 5A illustratively works by passing a pointer 520 to contextual data as a hidden argument to every function that is invoked in a given process. Note that application specific metadata can also be inserted at any point in the call stack, where, as mentioned above, it becomes part of the log context 420 and will be propagated from that point on. This ensures common metadata for trace entries which, along with the UUID, allows for correlation of trace entries that isolates any execution chain. (Note that the log context may be examined only by the runtime infrastructure under binary trace (btrace) API calls before emitting the actual trace entry.)

The compiler-instrumented approach allows existing legacy code to be instrumented without requiring manual rework of the existing code. That is, the compiler instrumentation may be configured with libraries and runtime infrastructures, and intercepts the call chain at appropriate points to provide for thread-safe propagation and termination of tracing within a process. This implementation illustratively handles asynchronous execution of a control flow through event schedulers and object databases that process at an object level.

As an alternative approach to compiler-based instrumentation, FIG. 5B illustrates propagation of the log/debug context 420 being accomplished through adding specific API calls 540 at specific points in the call stack, e.g., through asynchronous call contexts, object databases, and propagation over process boundaries via IPC. That is, FIG. 5B illustrates creation of a log/debug context 420 on a heap, where added (e.g., manually added) specific API calls are inserted at specific points in the call stack, such as wherever control is handed off to an event loop scheduler, IPC routine, etc., to appropriately preserve and propagate the log context.

Notably, in one embodiment herein, when object databases are involved in a process or between processes, or files are involved in communicating between processes, the log/debug context may sit in that object for some indeterminate time before a reader process comes along and reads it, at which point the context propagates within the reader process. During this idle time, it is quite possible that a fresh debug/log context lands on the object. According to this embodiment, the new context may replace the old one and the infrastructure records that overwrite, which is later useful when correlating an entire execution flow.

Figure 6A:
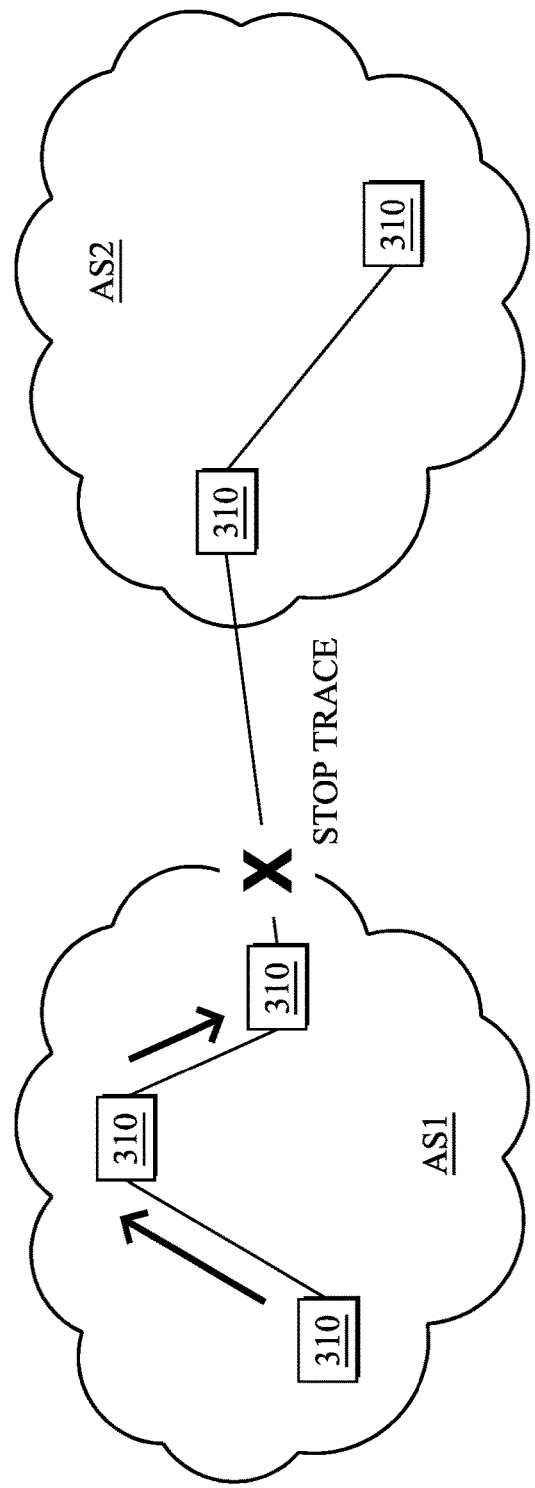

According to one or more embodiments herein, it is important to be able to intelligently stop the tracing as well. For instance, it is beneficial to provide a fallback termination mechanism for cases where the execution flow can keep propagating, e.g., because of acknowledgment (ACK) messages going back to previous processes and/or components, process fan-out (e.g., splitting the flow/thread into multiple paths), erroneous loops, excessively-sized logs, etc. Therefore, in addition to providing the ability to stop the tracing based on application-level control (e.g., API calls to stop the tracing), FIGS. 6A-6C illustrate additional examples of stopping software flow execution tracing according to various techniques herein. For example, FIG. 6A shows how a trace may be stopped at various types of deterministic boundaries (logical, device, network), such as at the edge of an autonomous system (AS) or other boundaries as may be configured. Alternatively, tracing may be stopped using half-life-like decay mechanism that is enforced using process hops (e.g., a length of the flow in general, or else in response to process (e.g., routing) loops such as shown in FIG. 6B) or call stack depth (e.g., as shown in FIG. 6C). The half-life decay mechanism essentially terminates tracing for an execution flow using call stack depth and/or process hops in a manner similar to time-to-live (TTL) counters and expiration, though other similar techniques may be used to terminate the trace at a certain point or in a manner that otherwise prevents excessive (e.g., looped) tracing.

Figures 7A, 7B:
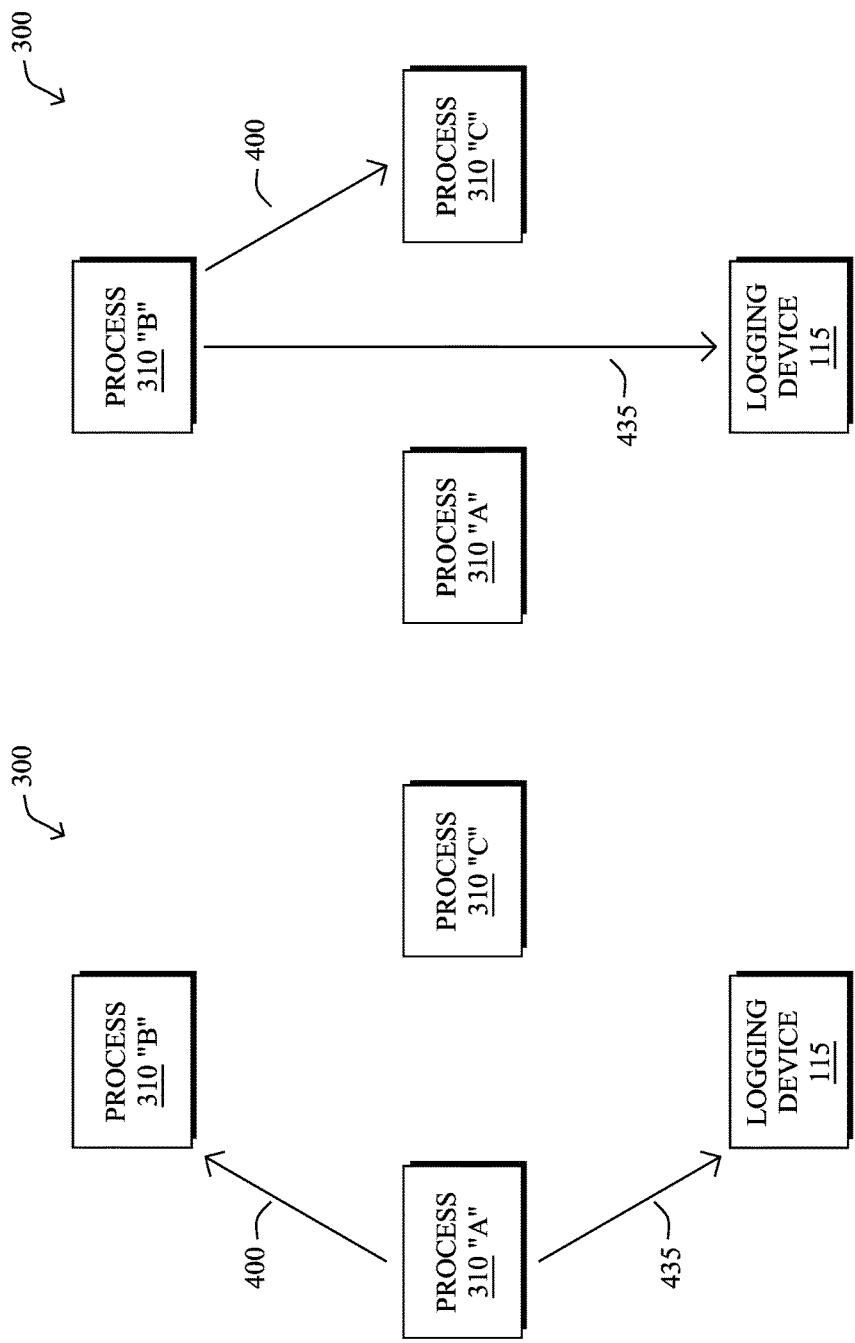
FIGS. 7A-7C illustrate an example of push-based log gathering.
Figure 7C:
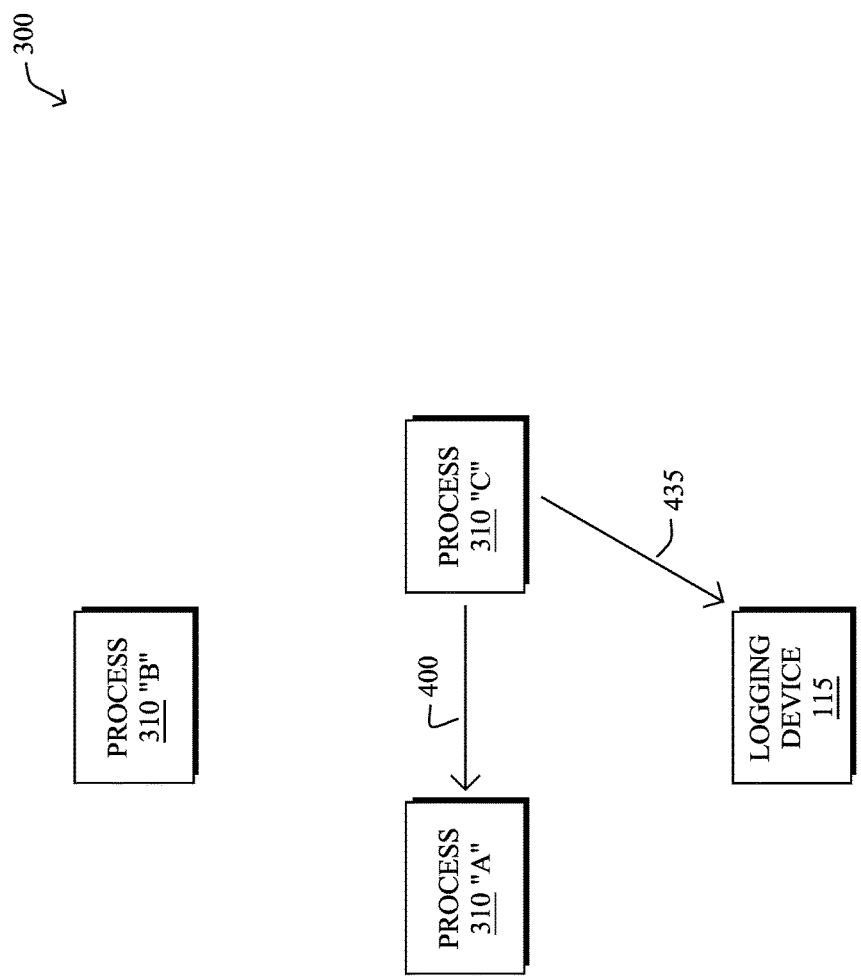

Regarding gathering and stitching of the log entries by a logging device/process, various embodiments may be configured to operate with the techniques described herein. For example, FIGS. 7A-7C illustrate an example of push-based log gathering, where, as each process 310 (e.g., A, B, then C) performs the execution flow 300 (from FIG. 7A-7C, respectively), the process sends (pushes) the log entries 435 to a centralized logging device 115 (or to one or more devices, if so configured). Alternatively, as shown in FIGS. 8A-8B, pull-based log gathering may comprise completion of the execution flow 300 (or at least independent execution) in FIG. 8A prior to sending requests 810 for the log entries 435.

Figure 9A:
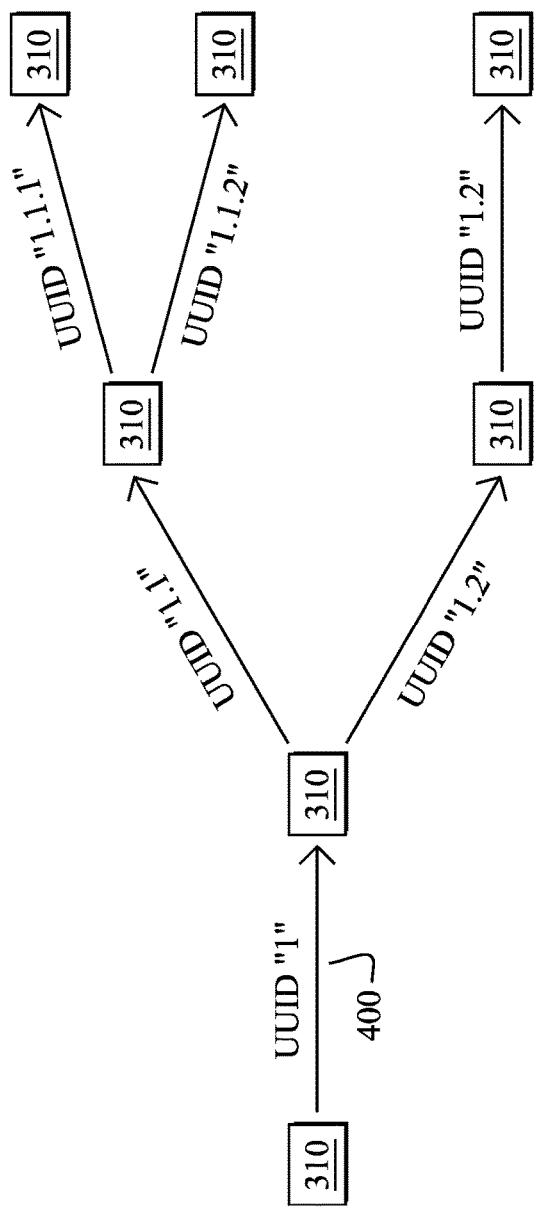
FIGS. 9A-9B illustrate an example of split-thread software flow execution tracing.
Figure 9B:
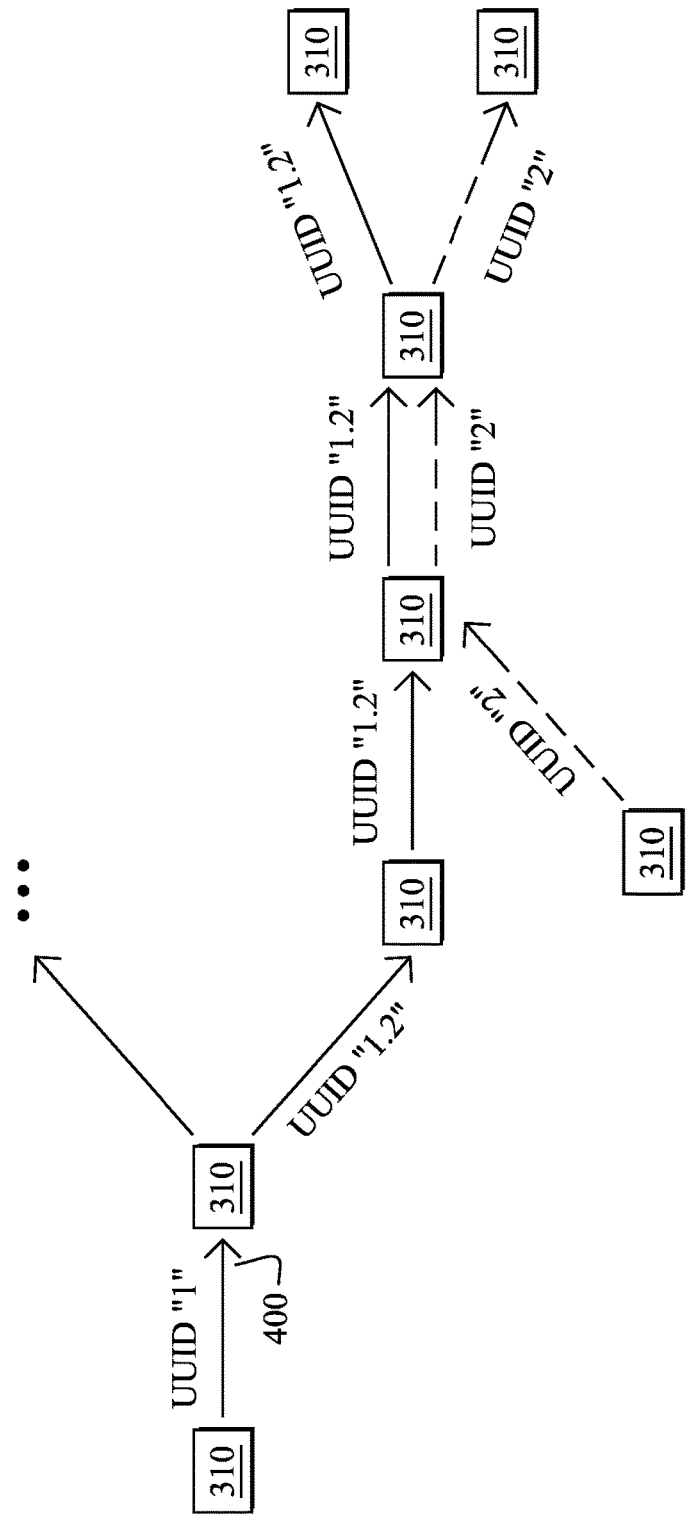

Note that as mentioned above, there are times when a process flow "fans out" into multiple paths of process "branches", such as where one process makes calls to multiple downstream processes, or where a serial process turns into a parallel process for some or all of the remaining flow, etc. Illustratively, FIGS. 9A-9B demonstrate a simplified example of such a "split-thread" software flow execution tracing, where, as shown in FIG. 9A, various flow branches are shown. According to the techniques herein, a UUID (e.g., UUID "1") may be used to create related UUIDs for the branches, such as, e.g., UUID 1.1 and 1.2 at the first branch, then UUIDs 1.1.1 and 1.1.2 at the second branch point, and so on. In this manner, multiple UUIDs can be correlated for the log stitching. In the illustrative 64-bit UUID example, a prefix-based implementation is possible, where, e.g., the first 56 bits may represent the primary UUID, and the remaining 8 bits are left for branch UUID management. (Any configuration of prefix-based UUID correlation may be used herein, and this example is merely one illustrative option for discussion herein.) As shown in FIG. 9B, any other UUID (e.g., UUID "2") may independently traverse the same sets of processes, and the UUIDs (1 and 2) may be appropriately kept separate during log stitching herein, as they are related to different execution flows.

According to the techniques herein, therefore, as apps/processes log their outputs, by embedding the UUID (or other types of uniquely identifiable markers), log entries related to the same execution flow can be stitched together, showing propagation from a point of entry through to each device that is part of the particular service being traced. This "end-to-end" trace takes a "slice" through the system based on the UUID to create the execution flow log 440, where the log context 420 may also provide additional analyzable information (e.g., the application-specific metadata).

Figure 10:
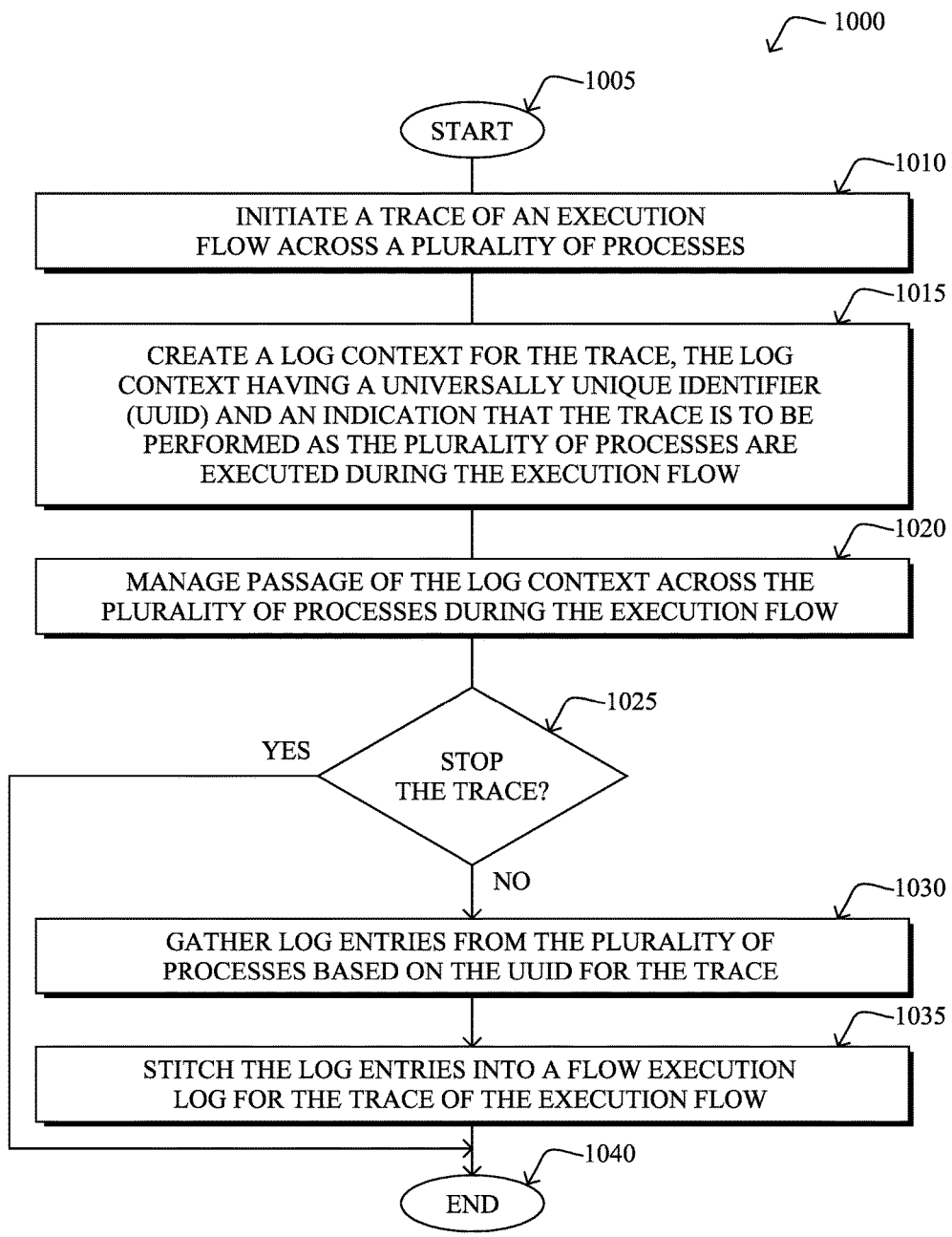
FIG. 10 illustrates an example simplified procedure for software flow execution tracing, particularly from the perspective of a logging device.

FIG. 10 illustrates an example simplified procedure for software flow execution tracing in accordance with one or more embodiments described herein, particularly from the perspective of a logging device 115. For example, a non-generic, specifically configured device (e.g., device 200) may perform procedure 1000 by executing stored instructions (e.g., process 248). The procedure 1000 may start at step 1005, and continues to step 1010, where, as described in greater detail above, logging process 248 initiates a trace of an execution flow across a plurality of processes 244 (e.g., where the plurality of processes are executed within a single device or across a plurality of devices). As detailed above, initiating may comprise defining a conditional debug condition on a particular one of the plurality of processes, where that particular process starts the trace in response to the conditional debug condition being met. Alternatively, the trace initiation may comprise directing an API call to the particular process to start the trace (e.g., the first process, or any process within the execution flow).

In step 1015, the logging process creates a log context 420 for the trace having the UUID and an indication (e.g., Boolean) that the trace is to be performed as the plurality of processes are executed during the execution flow. In step 1020, the logging process may then manage passage of the log context across the plurality of processes during the execution flow, such as by either passing the log context through a call stack of the execution flow using compiler instrumentation (e.g., FIG. 5A above) or else passing the log context over IPC using API calls (e.g., FIG. 5B above). Note that the passed log context may also comprise application-specific metadata, defined by the logging process 248 and/or by the executing process 244, as mentioned above.

In step 1025, at any time, the trace may be stopped at a particular one of the plurality of processes, such as based on application-level control (e.g., an API call to stop), or else based on reaching a trace limit (e.g., a call stack depth limit, a process hop limit, a device hop limit, a TTL expiration, a logical process boundary, a computer network boundary, and so on). If so, then the procedure may directly end (e.g., with a current log), or may continue to complete the log creation.

In particular, in step 1030, the logging process gathers log entries from the plurality of processes based on the UUID for the trace (e.g., where the log entries were created based on the indication being within the log context). For instance, as mentioned above in FIGS. 7A-8B, the logging process may request (pull) log entries that are associated with the UUID for the trace from the plurality of processes, or else may receive log entries pushed from the plurality of processes based on the log entries being created. In step 1035, the logging process may then stitch the log entries together into a flow execution log for the trace of the execution flow. Note also that the plurality of the processes may create application-specific metadata associated with the UUID, and as such, the logging process may correlate application-specific metadata with the corresponding UUID during the gathering/stitching.

Notably, as mentioned above (e.g., with reference to FIGS. 9A-9B), the execution flow may split into one or more branch flows. As such, the steps above may further be described as generating (step 1015) one or more branch UUIDs, where each branch UUID is correlated with the UUID for the trace and passed within the log context across a respective branch flow, and then gathering (step 1030) branch log entries based on the one or more branch UUIDs and stitching (step 1035) the branch log entries into the flow execution log for the trace of the execution flow.

The procedure 1000 illustratively ends in step 1040, though notably with the option to continue logging, whether based on new traces initiating (e.g., conditions met again), or else based on continuing to gather and stitch further log entries.

Figure 11:
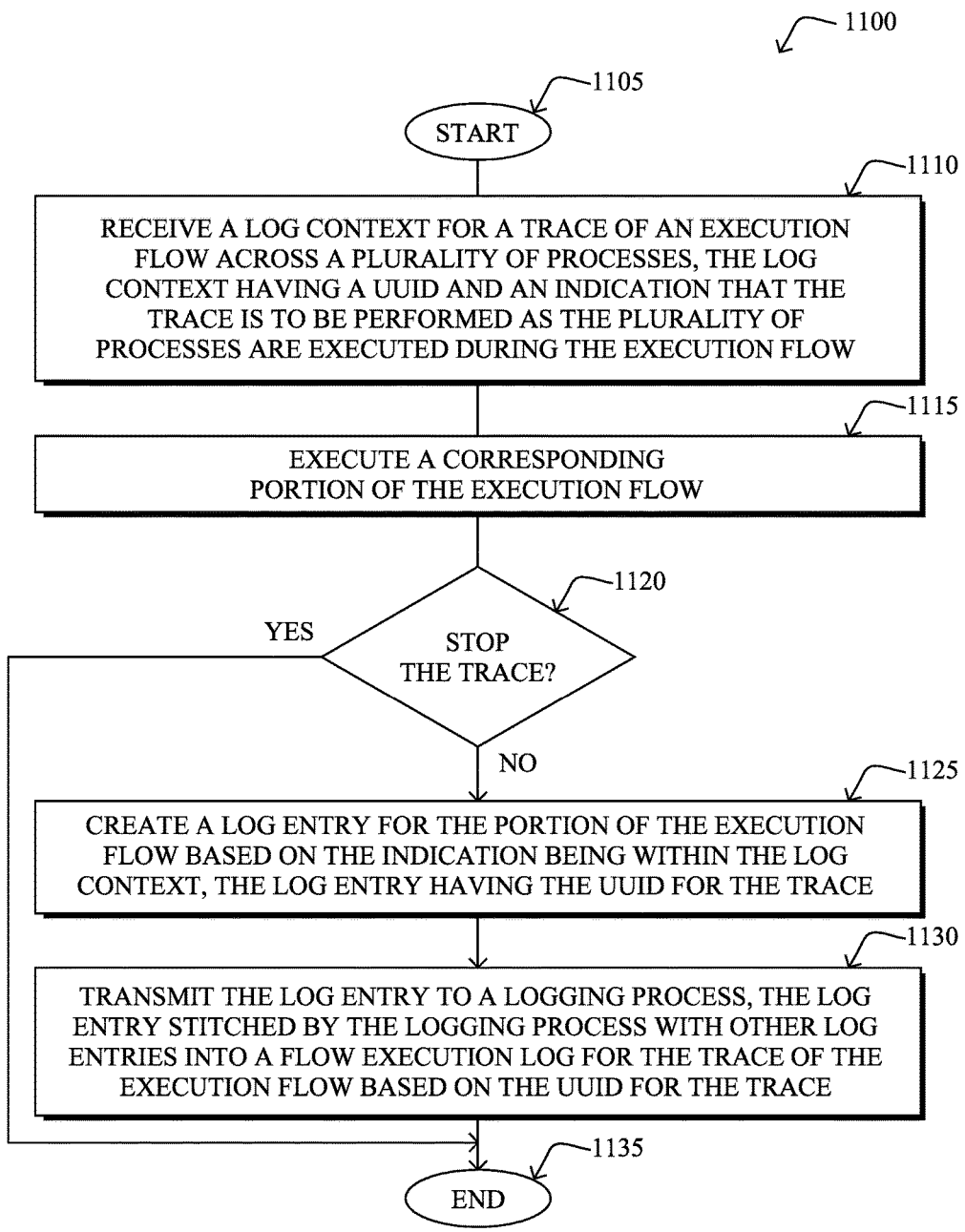
FIG. 11 illustrates another example simplified procedure for software flow execution tracing, particularly from the perspective of a computing device.

In addition, FIG. 11 illustrates another example simplified procedure for software flow execution tracing in accordance with one or more embodiments described herein, particularly from the perspective of a computing device 110. For example, a non-generic, specifically configured device (e.g., device 200) may perform procedure 1100 by executing stored instructions (e.g., processes 244/248). The procedure 1100 may start at step 1105, and continues to step 1110, where, as described in greater detail above, a particular process 244 (e.g., the process itself, or an associated logging process 248) receives a log context 420 for a trace of an execution flow across a plurality of processes, where the log context has a UUID and an indication that the trace is to be performed as the plurality of processes are executed during the execution flow. Note that as described above, the indication that the trace is to be performed may be set within the log context (e.g., Boolean yes/no) based on a conditional debug condition being met on a start-of-trace (not necessarily the start-of-flow) process of the plurality of processes.

In step 1115, the particular process executes a corresponding portion of the execution flow (i.e., the particular task or tasks to be performed by the particular process at this stage of the execution flow). If the trace is not to be stopped in step 1120 (e.g., based on reaching a trace limit at the particular process or receiving an API call to stop the trace), then in step 1125, in response to the indication being within the log context (and thus without requiring any extensive determination by the process as to whether tracing/logging need be performed), the particular process may create a log entry for the portion of the execution flow, where the log entry has the UUID for the trace (creating application-specific metadata associated with the UUID). In step 1130, either as a push or pull as mentioned above, the process may then transmit the log entry to a logging process (e.g., local or remote), such that the log entry can be stitched with other log entries into a flow execution log for the trace of the execution flow based on the UUID for the trace, as described herein. The illustrative procedure 1100 may then end in step 1135.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, provide for software flow execution tracing (e.g., "radioactive tracing"). In particular, the techniques herein make tracing and visibility into software systems possible in ways not previously available, increasing the serviceability of software systems in general. For example, the techniques herein provide consistency in common tracing metadata and by chaining the execution flow together through multiple systems using an underlying log/debug context that is propagated by underlying tracing runtime infrastructure, until execution of code flow terminates. In addition, particular key benefits may be associated with the techniques herein, such as debug condition(s) being evaluated only once, as well as the "heavy lifting" being performed by runtime infrastructure (without a need for feature/app developer cooperation) and the "thread-safe" nature of the techniques. Additionally, the logging and debug capability can serve as an educational tool to understand the execution flow of a feature.

While there have been shown and described illustrative embodiments that provide for software flow execution tracing (e.g., "radioactive tracing"), it is to be understood that various other adaptations and modifications may be made within the spirit and scope of the embodiments herein. For example, while certain embodiments are described herein with respect to computer network devices, the techniques herein are not limited as such and may be used for other types of computer program systems. In addition, while certain protocols and/or computer languages are shown, other suitable protocols and computer languages may be used, accordingly. Moreover, though the techniques herein have been generally described in relation to debugging applications, they can also be used for workflow processing (e.g., what devices fulfilled services or expectations), or also for packet tracing through a computer network (e.g., for participating devices, determining where the packet travels/transits), as well as many other use cases that can benefit from the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    initiating, by a logging process, a trace of an execution flow across a plurality of processes;
    creating, by the logging process, a log context for the trace, the log context having a universally unique identifier (UUID) and an indication that the trace is to be performed as the plurality of processes are executed during the execution flow;
    managing, by the logging process, passage of the log context across the plurality of processes during the execution flow, wherein application-specific metadata associated with the UUID is added to the log context during the passage of the log context;
    gathering, by the logging process, log entries from the plurality of processes based on the UUID for the trace and the application-specific metadata associated with the UUID, the log entries created based on the indication being within the log context; and
    stitching, by the logging process, the log entries into a flow execution log for the trace of the execution flow.

2. The method as in claim 1, wherein initiating comprises:
    defining a conditional debug condition on a particular one of the plurality of processes, wherein the particular one of the plurality of processes starts the trace in response to the conditional debug condition being met.

3. The method as in claim 1, wherein initiating comprises:
    directing an application programming interface (API) call to a particular one of the plurality of processes to start the trace.

4. The method as in claim 1, further comprising:
    stopping the trace at a particular one of the plurality of processes based on application-level control.

5. The method as in claim 1, further comprising:
    stopping the trace at a particular one of the plurality of processes based on reaching a trace limit.

6. The method as in claim 5, wherein the trace limit is selected from a group consisting of: a call stack depth limit; a process hop limit; a device hop limit; a time-to-live (TTL) expiration; a logical process boundary; and a computer network boundary.

7. The method as in claim 1, wherein managing passage of the log context comprises:
    passing the log context through a call stack of the execution flow using compiler instrumentation.

8. The method as in claim 1, wherein managing passage of the log context comprises:
    passing the log context over inter-process communication (IPC) using application programming interface (API) calls.

9. The method as in claim 1, wherein the execution flow splits into one or more branch flows, the method further comprising:
    generating one or more branch UUIDs, each branch UUID correlated with the UUID for the trace and passed within the log context across a respective branch flow;
    gathering branch log entries based on the one or more branch UUIDs; and
    stitching the branch log entries into the flow execution log for the trace of the execution flow.

10. The method as in claim 1, further comprising:
    correlating the application-specific metadata with the UUID.

11. The method as in claim 1, wherein gathering comprises:
    requesting log entries that are associated with the UUID for the trace from the plurality of processes.

12. The method as in claim 1, wherein gathering comprises:
    receiving log entries pushed from the plurality of processes based on the log entries being created.

13. The method as in claim 1, wherein the plurality of processes are executed within a single device.

14. The method as in claim 1, wherein the plurality of processes are executed across a plurality of devices.

15. A tangible, non-transitory, computer-readable medium storing program instructions that cause a computer to execute a process, the process, when executed, operable to: initiate a trace of an execution flow across a plurality of processes; create a log context for the trace, the log context having a universally unique identifier (UUID) and an indication that the trace is to be performed as the plurality of processes are executed during the execution flow; manage passage of the log context across the plurality of processes during the execution flow, wherein application-specific metadata associated with the UUID is added to the log context during the passage of the log context; gather log entries from the plurality of processes based on the UUID and the application-specific metadata associated with the UUID for the trace, the log entries created based on the indication being within the log context; and stitch the log entries into a flow execution log for the trace of the execution flow.

16. The computer-readable media as in claim 15, wherein process, when executed to initiate the trace, is further operable to at least one of either:
    a) define a conditional debug condition on a particular one of the plurality of processes, wherein the particular one of the plurality of processes starts the trace in response to the conditional debug condition being met; and
    b) direct an application programming interface (API) call to a particular one of the plurality of processes to start the trace.

17. The computer-readable media as in claim 15, wherein process, when executed, is further operable to at least one of either:
    a) stop the trace at a particular one of the plurality of processes based on application-level control; and
    b) stop the trace at a particular one of the plurality of processes based on reaching a trace limit.

18. A method, comprising:
    receiving, by a particular process, a log context for a trace of an execution flow across a plurality of processes, the log context having a universally unique identifier (UUID) and an indication that the trace is to be performed as the plurality of processes are executed during the execution flow;
    executing, by the particular process, a corresponding portion of the execution flow;

creating, by the particular process, a log entry for the portion of the execution flow based on the indication being within the log context, the log entry having the UUID for the trace and application-specific metadata associated with the UUID; and transmitting, by the process, the log entry to a logging process, the log entry stitched by the logging process with other log entries into a flow execution log for the trace of the execution flow based on the UUID for the trace and the application-specific metadata associated with the UUID.

19. The method as in claim 18, wherein the indication that the trace is to be performed is set within the log context based on a conditional debug condition being met on a start-of-trace process of the plurality of processes.

20. The method as in claim 18, further comprising:

stopping the trace based on reaching a trace limit at the particular process.

\* \* \* \* \*